United States Patent [19]

Kuroiwa

[11] 3,995,421
[45] Dec. 7, 1976

[54] METHOD OF INCREASING THE OUTPUT OF HYDROGEN COMBUSTION TYPE INTERNAL COMBUSTION ENGINE BY RECOVERY OF GENERATED HEAT AND APPARATUS THEREFOR

[76] Inventor: Sajio Kuroiwa, 24-15, Nishikuma, Kochi, Kochi, Japan

[22] Filed: Nov. 26, 1974

[21] Appl. No.: 527,425

[30] Foreign Application Priority Data
Nov. 30, 1973 Japan .............................. 48-135178

[52] U.S. Cl. .......................... 60/39.46 R; 60/39.54; 60/39.55; 60/39.69; 123/8.13; 123/8.49
[51] Int. Cl.² ........................ F02C 7/00; F02C 3/24
[58] Field of Search ............ 60/649, 673, 651, 650, 60/671, 670, 39.46 R, 39.55, 39.54, 39.69; 123/1 A, 8.09, 8.13, 8.49, 78 R, 78 B

[56] References Cited
UNITED STATES PATENTS

| | | | |
|---|---|---|---|
| 2,393,749 | 1/1946 | Cadella | 123/78 |
| 2,447,696 | 8/1948 | Forsyth | 60/39.54 X |
| 3,101,592 | 8/1963 | Robertson et al. | 60/649 X |
| 3,471,274 | 10/1969 | Quigley, Jr. | 123/1 A |
| 3,608,529 | 9/1971 | Smith et al. | 123/1 A |

*Primary Examiner*—Allen M. Ostrager
*Attorney, Agent, or Firm*—Wenderoth, Lind & Ponack

[57] ABSTRACT

This invention relates to a new method of increasing the output of a hydrogen combustion type internal combustion engine by recovery of generated heat and to an apparatus therefor. It is the main object of the invention to raise engine output by producing steam by having generated heat absorbed in water obtained from combustion of hydrogen, obtaining high-pressure generated steam by having said heat re-absorbed in newly introduced water and combining said high-pressure steam with said produced steam.

9 Claims, 5 Drawing Figures

METHOD OF INCREASING THE OUTPUT OF HYDROGEN COMBUSTION TYPE INTERNAL COMBUSTION ENGINE BY RECOVERY OF GENERATED HEAT AND APPARATUS THEREFOR

BACKGROUND OF THE INVENTION

It is an incontrovertible fact that the petroleum resources existing on the earth are limited and destined to be exhausted some day. Today the petroleum demand is rapidly increasing. If petroleum continues to be consumed at the present high rate, the demand-supply relation must certainly become unbalanced in the near future. As petroleum is unevenly distributed among the countries of the world, "have-not" nations cannot avoid facing energy crises as long as they depend upon petroleum. In recent years, the tendency to regard petroleum as almighty has come to be reviewed because of its unfavorable effects on the human body. With respect to automobiles in particular, there has been a strong cry for pollution-free gasoline engines. This has led to realization of the necessity of the conversion of engines to a substitute for petroleum as a fuel and of the effective utilization of hydrogen energy in particular. Hydrogen can be obtained easily at any place on the earth from mere decomposition of water. Therefore, hydrogen resources are practically limitless. Hydrogen is also called the ultimate energy because, when it is burnt, it only produces water without emitting exhaust gas. There is not fear of causing air pollution at all.

This invention, presented with the above situation as the background, will serve to the hydrogen engine, as a substitute for the petroleum engine, into full practical use.

The greatest drawback of a hydrogen engine was conventionally said to be the very low calorific value of hydrogen at the time of combustion as compared with that of gasoline. Because of this fact, there is the necessity of transporting a large volume of hydrogen where the engine is on a vehicle, while the means of transporting it is difficult to operate and it is highly dangerous. Also, the low calorific value makes it impossible for a hydrogen engine to operate for a sufficiently long time or distance. In other words, a sufficiently large output of such an engine cannot be obtained from the expansion energy at the time of the instantaneous production of water vapor produced by combustion of only hydrogen because the quantity of produced water is very small. Increasing the quantity of hydrogen to cover this defect is uneconomical and involves transportation difficulty as stated above. Since overheating of an internal combustion engine must be prevented, some means is necessary to remove the heat produced at the time of hydrogen combustion and the mechanical frictional heat generated from the engine.

SUMMARY OF THE INVENTION:

This invention relates to method of increasing the output of a hydrogen combustion type internal combustion engine by recovery of generated heat and to an apparatus therefor. In order to effectively utilize and deal with the energy in the form of said generated heat, the generated heat is absorbed in water or steam which is introduced into the internal combustion engine, and the expansion energy thus generated from the water or steam is utilized to operate an internal combustion engine such as a turbine engine or a reciprocating engine. As compared with a conventional internal combustion engine, which most of such generated heat is simply disapated into the air without being used, the method of this invention makes it possible to effectively utilize this energy by introducing water or steam into engine so as to absorb it. Therefore, the thermal efficiency of the internal combustion engine is improved and the energy loss greatly reduced. This internal combustion engine is completely free from the production of harmful matter and is completely non-polluting.

As already stated, hydrogen as an energy source is turned into water, if burnt, and the water can be reused for producing hydrogen by decomposition or dissociation. This natural circulation permits an effective exploitation of the limited resources on the earth.

For a country having limited energy resources, development of hydrogen energy systems is the only way to success in securing energy. In this sense, putting to practical use a hydrogen engine as achieved by the present invention is of great significance.

The steam generating method to be employed in this internal combustion engine is entirely novel. The present invention is characterized by burning hydrogen in a cylinder and utilizing the heat produced from the combustion and the heat generated from friction between the moving parts of the engine and having such heat absorbed in water injected under pressure or sucked in or in low-temperature steam. Compared with an external combustion method, this method wastes little heat and has many advantages. A point worth attention is the idea of effectively controlling the volume of water or low-temperature steam introduced into the engine so that the temperature of the steam generating cylinder and the inside thereof will not drop below the critical temperature of water, namely 374.15° C.

In a hydrogen engine according to an earlier conception, the fact that knocking was liable to occur owing to the high speed of the hydrogen reaction was considered to be the main problem.

The hydrogen engine according to the present invention is a rotary type engine to be described later in detail. The engine, therefore, has the advantage that, since it is strongly rotated by the combined output of produced steam and high pressure steam, ejection of steam (occurrence of hydrogen combustion) at any moment cannot cause said knocking or reversing.

Unlike the method in which steam is obtained by boiling water provided in advance, the method of this invention in which introduced water is evaporated instantaneously by high generated heat, which by the way is a basic concept of this invention, has the advantage of permitting excellent thermal efficiency and ensuring continuous supply of high-pressure steam only by means of the generated heat. It is another feature of this invention that the adoption of the method of recovering generated heat by the addition of water or low-temperature steam can reduce the production of NOx (nitrogen oxide) because the engine temperature in this case is lower than when only hydrogen is burnt. Also, with a hydrogen combustion type combustion engine operated with recovery of exhaust heat (generated heat), the sound of operation is far quieter than for any conventional type of engine and the noise problem is entirely absent.

The method and apparatus of this invention will be described in further detail with regard to a specific of embodiment by referring to the accompanying drawing.

The accompanying drawing illustrates the basic principles of the method a increasing the output of hydrogen type internal combustion engine and an apparatus therefore according to this invention, wherein.

DESCRIPTION OF PREFERRED EMBODIMENTS

In this description, steam utilized in the engine is designated according to the manner of generation. Steam is either produced steam or generated steam. The former is the steam produced by the absorption of generated heat by water produced at the time of hydrogen combustion, whereas the latter is the steam produced by the absorption of said generated heat by introduced water. "Generated heat" is the general term for the heat energy produced by hydrogen combustion for the frictional heat produced between moving parts of the internal combustion engine.

EXAMPLE I - A ROTARY TYPE HYDROGEN ENGINE

Figure 1:
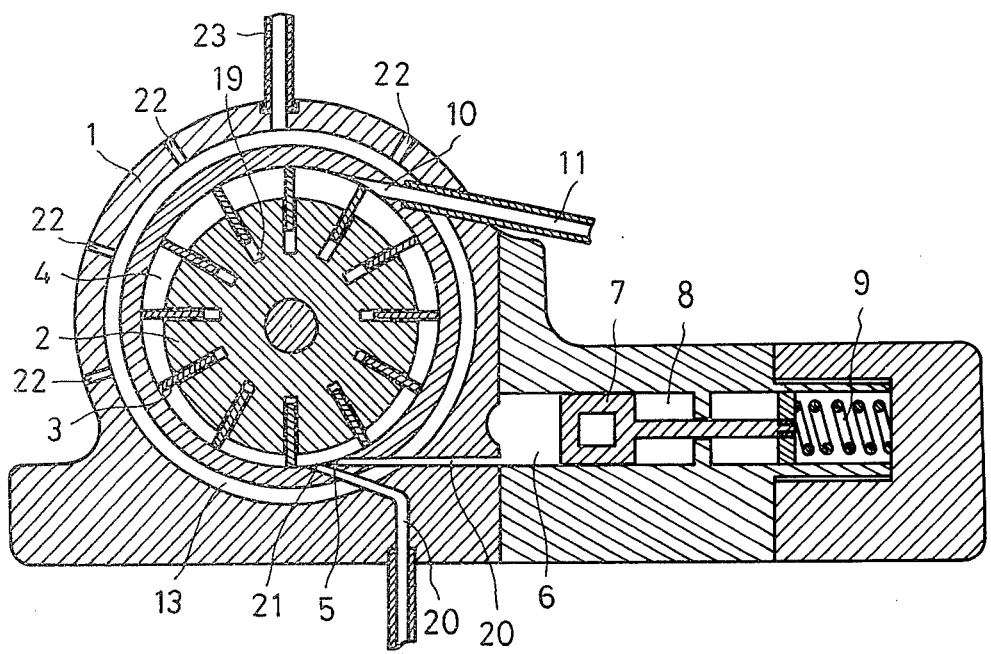
FIG. 1 and FIG. 3 are schematic longitudinal sectional views showing an example of a high-pressure and low-pressure hydrogen engine, respectively.
Figure 2:
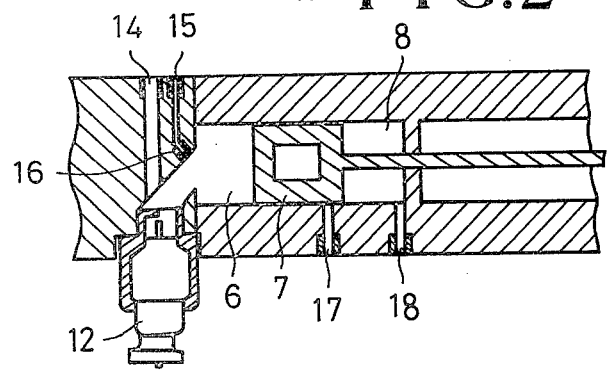
FIG. 2 is a cross sectional view showing an example of the hydrogen combustion and steam generating cylinder part thereof.
Figure 3:
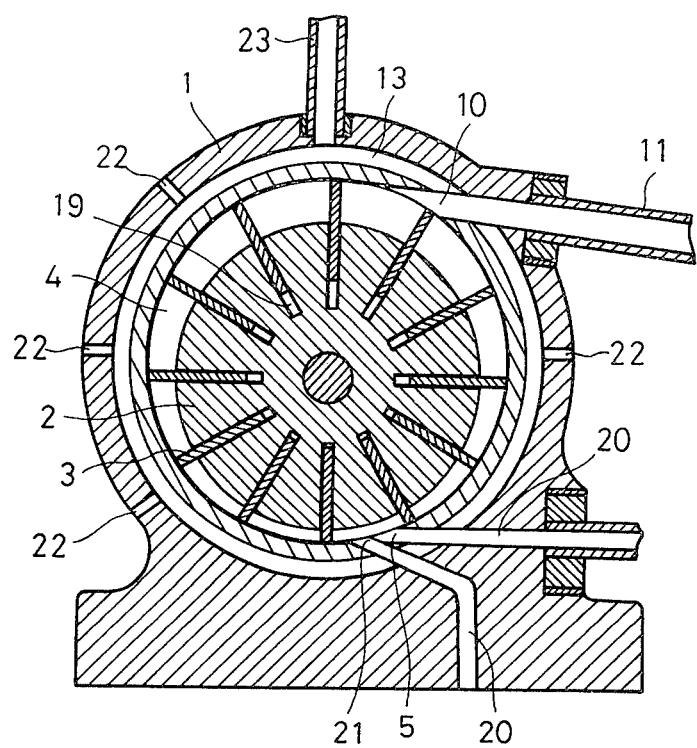
Figure 4:
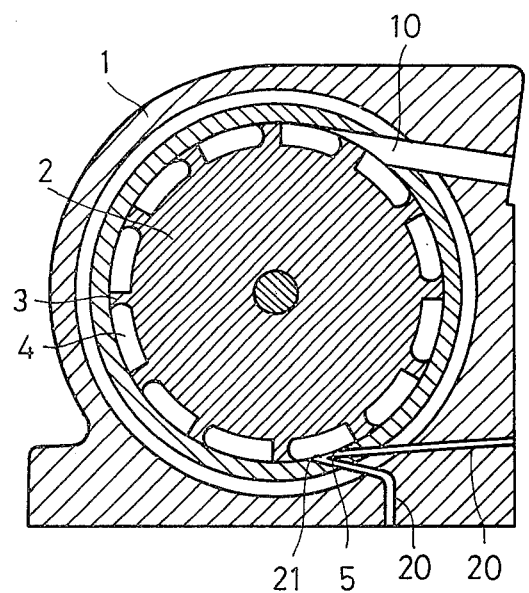
FIG. 4 is a schematic longitudinal sectional view showing an example of the engine having concentrically rotating rotor.

As illustrated in FIG. 1, hydrogen is burnt by providing rotor 2 supported an an eccentric shaft in engine casing 1, forming radial grooves 19 in said rotor 2, fitting rotor vanes 3 freely slidably in grooves 19 in gas tight relationship therewith, alternatively, as shown in FIG. 4, the shaft can be concentric and rotor 2 can have a multitude of radially protruding integral members 3 around the periphery of rotor 2. Said valves or protruding parts 3 are slidable on the inner surface of engine casing 1, which in turn has more steam ejecting ports 5 and steam exhausting ports 10 at suitable locations around the engine casing 1. The engine has one or more hydrogen combustion and steam generating cylinders 6, said cylinders being connected to engine casing 1 through ejecting ports 5. As shown in FIG. 2, hydrogen gas and air or oxygen as an oxidizing agent are introduced into each cylinder 6 by an injection pump, valve and supply pipe 14 by injection under pressure or suction and the hydrogen is ignited by ignition device 12 provided in cylinder 6. The produced water obtained from hydrogen combustion absorbs the heat produced at the time of hydrogen combustion and the generated heat such as the frictional heat generated between the moving component parts of the engine and instantaneously becomes steam and expands. (This steam will be hereafter called produced steam.) Simultaneously with this combustion or after this combustion, a small volume of water or steam is introduced into cylinder 6 through pressure water pipe 15 and injection nozzle 16 under pressure, suction or dripping. The water or steam thus introduced into cylinder 6 absorbs said produced heat and generated heat such as frictional heat occurring inside cylinder 6 and in the cylinder body and piston instantaneously becomes steam and expands. As a result, the inside of cylinder 6 is under high pressure due to the prescence of said produced steam and generated steam. Said high-pressure steam passes through passage 20 and is ejected in the form of a high-speed jet from ejecting port 5 in the direction of spaces 4 of engine casing 1 defined between rotor 2 and adjacent radial projecting members 3. This energy gives to rotor 2 a powerful rotating motion in the direction of the steam ejection. Vane members 3, in FIGS. 1 and 3 as rotor seals and press tightly on the inner surface of the engine casing 1 due to centrifugal force and seal the gradually enlarging spaces between the vanes 3. Steam is exhausted through steam exhausting ports 10 provided at suitable locations in engine casing 1 and can flow into a low-pressure engine through pipe 11 for further use.

Piston 7 is supported by coil spring 9 in cylinders 6 and is provided when necessary when the volume of steam to be used and the volume of steam to be generated must be increased so as to increase engine output. Piston 7 is a device serving to protect steam generating cylinders 6 against impact pressure (breaking pressure) caused by hydrogen combustion and the instantaneous generation of high-pressure steam by introduction of water or steam, by equalizing the pressure of generated steam to some extent and prolonging the ejecting time to some extent. This device is not necessary in some cases. An accumulator may be used to fulfill the above functions of this device in some cases. When it is necessary to increase the output by continuous steam ejection, a plurality of steam generating cylinders are provided and connected to engine casing 1 either in series or in parallel.

Figure 5:
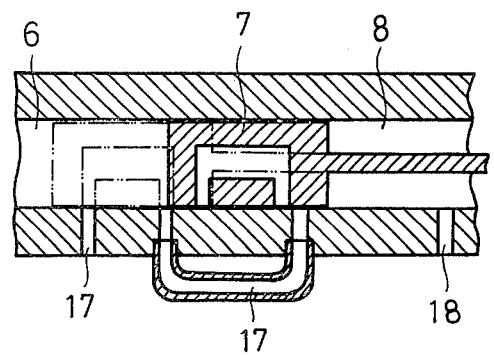
FIG. 5 a schematic sectional view showing an example of the piston valve for exhausting the generated steam injected on the back side of the piston in the engines of FIGS. 1, 3 and 4.

This invention provides another method of obtaining high-pressure generated steam by using introduced water as described below. The high pressure engine or low-pressure engine has engine casing 1 with a double wall construction, as shown in FIG. 3. An annular space 13 is formed around the rotor chamber, said annular space 13 being provided with one or more water or steam introducing ports 22 and also with exhausting port 23 at a suitable location. Water or steam is intermittently injected in the form of drops or mist into annular space 13 so as to absorb the generated heat of engine casing 1 and cool it, and steam is instantaneously generated to recover part of the heat energy. This generated steam (recovered steam) is injected into back chamber 8 of pressure regulating piston 7 through exhausting port 23 and generated steam injecting port 18 provided in cylinder 6 and connected to exhausting port 23, as shown in FIG. 2 and FIG. 5, and becomes generated steam having a higher pressure after re-absorbing the heat generated in the back part of piston 7 and cylinder 6. This high-pressure generated steam helps advance piston 7. The steam produced in the front part of piston 7 is injected under pressure into the engine through ejecting port 5 by said advancing force. Also, exhausting port 17 is opened when piston 7, has advanced, e.g. up to the imaginary line portion in FIG. 5 and thereafter the high-pressure generated steam which has served as the force to propel said piston is injected into engine through steam injection nozzle 21 connected to exhausting port 17. It is also possible to have this generated steam injected directly into the engine casing from exhausting port 23 through ejecting port 21. Needless to say, this generated steam can be obtained not only in engine casings such as the one described above but also by recovering heat, using water as the medium for absorbing heat, from parts like engine blocks and engine housings or from cylinders and other places which are heated with generated heat by thermal conduction. (The general term for these parts is internal combustion engine structure.) The construction of a low-pressure engine can be identical to that of the above described high-pressure engine. For example, a low-pressure engine can have the construction as shown in FIG. 3 which is the same as the construction of the high-pressure engine except that the low-pressure engine does not have the steam generating cylinders 6. In this case, the steam exhausted from the high-pressure engine through exhaust pipe 11 is received through passage 20 and is exhausted through exhausting port 11 after it has rotated rotor 2 in the same way as described above. The space 4 between rotor 2 and engine casing 1 in this case should preferably be somewhat larger than in a high-pressure engine so that the steam can fulfill said function while being expanded.

The steam which is exhausted from the low-pressure engine through exhausting port 11 is sometimes condensed by a steam condenser to raise the engine efficiency and the water obtained from condensation is reused. The ignition device 12 may be any of various known types. For example, the conventional method in which the generator or battery is used as the power source and an ingition coil is used as a high-tension current igniter or a new method in which a piezo-electric element is used to facilitate ignition may be employed.

EXAMPLE II - A RECIPROCATING ENGINE

Although not illustrated in particular, the hydrogen engine according to this invention can be readily embodied as a conventional reciprocating engine with minor changes thereof. Air is first sucked into a conventional cylinder and, at the last stage of the suction of air, hydrogen gas is injected under pressure or sucked into the cylinder.

Then the gas is ignited by an ignition device and exploded. In this case, the ignition time must be much later than with a gasoline engine because hydrogen reacts so fast compared with gasoline that detonation will occur at the same time as ignition. A small quantity of water pessurized by a pump such as a Milton-Roy pump is injected or sprayed into the cylinder simultaneously with ignition. At the same time, pressurized water is injected intermittently into each engine block to generate steam so as to cool the engine and effectively utilize the heat energy generated in each engine block. This steam can be supplied to the cylinder through a pipe and valve. As the valve is opened in the expansion process, the steam is injected into the cylinder to serve to increase engine output and decrease the generation of nitric oxide. In this case, a radiator and other attachments to the conventional engine become unnecessary.

What I claim is:

1. An apparatus for improving the output of a hydrogen combustion type internal combustion engine by recovery of generated heat, which comprises: an engine casing defining an engine chamber adapted to be separated from the atmosphere; a rotor rotatably supported therein and defining an annular space between the circumferential surface of said rotor and the inner surface of said engine chamber; a plurality of vane members projecting radially outwardly from the outer circumference of said rotor and slidably sealing against the interior wall surface of said engine chamber for partitioning said annular space; at least one cylinder spaced from said engine chamber and defining a combustion chamber; a cushioning piston reciprocally movable within said cylinder for adjusting the volume of said combustion chamber and accommodating the pressure formed therewithin, said cylinder having a rear cylinder space on the opposite side of said cushioning piston from said combustion chamber; means on said cylinder for supplying hydrogen gas and oxygen containing gas to said combustion space and ignition means on said cylinder for causing said hydrogen gas to be combusted within said combustion chamber, thereby producing water vapor therefrom; means on said cylinder for supplying water in a form no more volatile than water vapor of a low temperature for producing water vapor by absorbing heat generated from said combustion of said hydrogen gas within said combustion chamber; the end of said cylinder having said combustion chamber therein being connected to said engine chamber for directing the water vapor obtained from said combustion chamber into said annular space within said engine chamber for rotating said rotor by the combined jet energy and expansion energy of the thus obtained water vapor; exhaust means opening out of said annular space for exhausting said water vapor from said engine chamber after it has rotated said rotor within said engine chamber; a wall encircling said engine casing and defining a space therearound shut off from the atmosphere; means on said wall for supplying water in a form no more volatile than water vapor at a low temperature into said space for cooling down said engine casing and producing a secondary water vapor and thereby absorbing the heat generated in said engine casing; means coupled between said wall and said cylinder for directing secondary water vapor generated within said space out of said engine casing and introducing it into said rear cylinder space; and means coupled between said cylinder at a point adjacent the rear side of said piston at its position closest to said engine casing and said engine casing for supplying said secondary water vapor to said annular space in said engine casing; whereby the secondary vapor exerts a pressure on said cushioning piston which is added to the pressure of the water vapor in the combustion chamber to increase the energy of the water vapor in the combustion chamber as it is ejected into said annular space in said engine casing, and the secondary water vapor after it has exerted its pressure on said cushioning piston is conducted to said annular space in said engine casing to act on the rotor directly, thereby increasing the output power of said engine.

2. The apparatus as claimed in claim 1 further comprising a low pressure engine rotor, and means for supplying the water vapor from the exhaust means of said engine casing for rotating said low pressure engine rotor, whereby said low pressure engine rotor produces further output power.

3. The apparatus as claimed in claim 1, further comprising means for circulating water in a form no more volatile than water vapor at a low temperature as a heat absorbing medium from one portion of the engine structure having a relatively low temperature in succession through other portions of the engine structure relatively higher temperatures for recovering heat and obtaining water vapor, and supplying said water vapor into said engine chamber rear cylinder space for increasing the output power of said rotor.

4. The apparatus as claimed in claim 1, further comprising means for circulating water in a form no more volatile than water vapor at a low temperature as a heat absorbing medium from one portion of the engine structure having a relatively low temperature in succession through other portions of the engine structure relatively higher temperatures for recovering heat and obtaining water vapor, and supplying said water vapor into said engine chamber engine chamber space for increasing the output power of said rotor.

5. The apparatus as claimed in claim 1 wherein said cylinder further has a spring therein urging said cushioning piston toward said engine casing for obtaining an improved cushioning effect.

6. The apparatus as claimed in claim 1 wherein said cushioning piston has a passage therethrough for conducting water vapor introduced into said rear cylinder space to pass therethrough, whereby heat generated in said piston during passing of water vapor therethrough is recovered and supplied to said engine chamber.

7. The apparatus as claimed in claim 1 wherein said plurality of vane members partitioning said annular space of said engine chamber extend radially outwardly from the outer circumference of said rotor and are slidable toward and away from the outer circumference of said rotor so that the ends of said vane members constantly and sealingly contact contacting the interior wall surface of said engine chamber.

8. The apparatus as claimed in claim 1 wherein said plurality of vane members partitioning said annular space of said engine chamber are integral with said rotor and extend radially outwardly from the outer circumference of said rotor.

9. A method of improving the output of a hydrogen combustion type internal combustion engine by recovery of heat generated therein, which comprises the steps of; generating water vapor by combustion of hydrogen gas in a combustion chamber which is completely shut off from the atmosphere; supplying water in a form no more volatile than water vapor of a low temperature into said combustion chamber and increasing the temperature thereof by absorption of heat generated by said combustion of said hydrogen gas; joining the water vapor obtained by said two steps and ejecting the thus obtained water vapor into an engine chamber also completely shut off from the atmosphere and independent from said combustion chamber and having a rotor therein for rotating said rotor so as to produce a rotating output power; supplying water in a form no more volatile than water vapor of a low temperature into a space within the structure composed by said engine chamber and surrounding said engine chamber for absorbing the heat generated in said structure comprised by said engine chamber for obtaining a secondary water vapor; recovering said secondary water vapor obtained from absorbing heat from said engine and introducing it into the space behind a cushioning piston in a cylinder coupled to said engine chamber for reuse for causing said cushioning piston to be advanced for forcing the generated water vapor into said engine chamber with a greater force than without said water vapor being introduced behind said cushioning piston and causing said rotor to be rotated with a greater force; and therefore ejecting the secondary water vapor from behind said cushioning piston through an independent passage communicating with said engine chamber into said engine chamber, whereby said rotor is caused to produce further rotating output power.

* * * * *